United States Patent [19]
Alferness et al.

[11] Patent Number: 5,611,065
[45] Date of Patent: Mar. 11, 1997

[54] ADDRESS PREDICTION FOR RELATIVE-TO-ABSOLUTE ADDRESSING

[75] Inventors: Merwin H. Alferness, New Brighton; Joseph P. Kerzman, Spring Lake Park; John Z. Nguyen, Roseville, all of Minn.

[73] Assignee: Unisys Corporation, Blue Bell, Pa.

[21] Appl. No.: 306,085

[22] Filed: Sep. 14, 1994

[51] Int. Cl.[6] .......................... G06F 12/00; G06F 12/02; G06F 9/26; G06F 9/34
[52] U.S. Cl. ................ 395/421.1; 395/414; 395/421.03; 395/421.07; 395/421.11; 395/412.04
[58] Field of Search ................................ 395/421.1, 401, 395/421.03, 421.07; 340/172.5

[56] References Cited

U.S. PATENT DOCUMENTS

| | | | |
|---|---|---|---|
| 3,303,477 | 2/1967 | Voigt | 340/172.5 |
| 3,389,380 | 6/1968 | Ashbaugh et al. | 340/172.5 |
| 3,470,537 | 9/1969 | Goshorn et al. | 340/172.5 |
| 3,510,847 | 5/1970 | Carlson et al. | 340/172.5 |
| 3,731,283 | 5/1973 | Carlson et al. | 395/421.1 |
| 3,754,218 | 8/1973 | Hatta et al. | 340/172.5 |
| 3,815,101 | 6/1974 | Boss et al. | 340/172.5 |
| 4,837,738 | 6/1989 | Lemay et al. | 395/421.1 |
| 5,442,767 | 8/1995 | Eickenmeyer et al. | 395/401 |

*Primary Examiner*—Robert W. Downs
*Assistant Examiner*—Than V. Nguyen
*Attorney, Agent, or Firm*—Charles A. Johnson; Mark T. Starr

[57] ABSTRACT

A base address prediction system for predicting one of a plurality of base addresses to be added to a known relative address in order to generate an absolute address. An actual base address determined from the relative address is also generated. The actual base address determination takes longer to generate than the predicted base address determination, and therefore the predicted base address is used to select a base address as long as the prediction is correct. Circuitry exists to compare the predicted base address with the actual base address, and if not equal, the predicted base address will be nullified, and the actual base address will be used. Prediction modes are dependent on whether the relative address indicates an instruction fetch or an operand fetch. Where the relative address indicates an instruction fetch, the prediction will be based on the last base address used, on the assumption that instructions will be contiguous in a single block of memory. Where the relative address indicates an operand fetch, the prediction will only change upon the occurrence of two consecutive incorrect predictions, and the actual base address will be used during incorrect prediction periods. Staged latching circuitry and comparison circuitry provides a method of determining whether two consecutive predictions were incorrect.

10 Claims, 9 Drawing Sheets

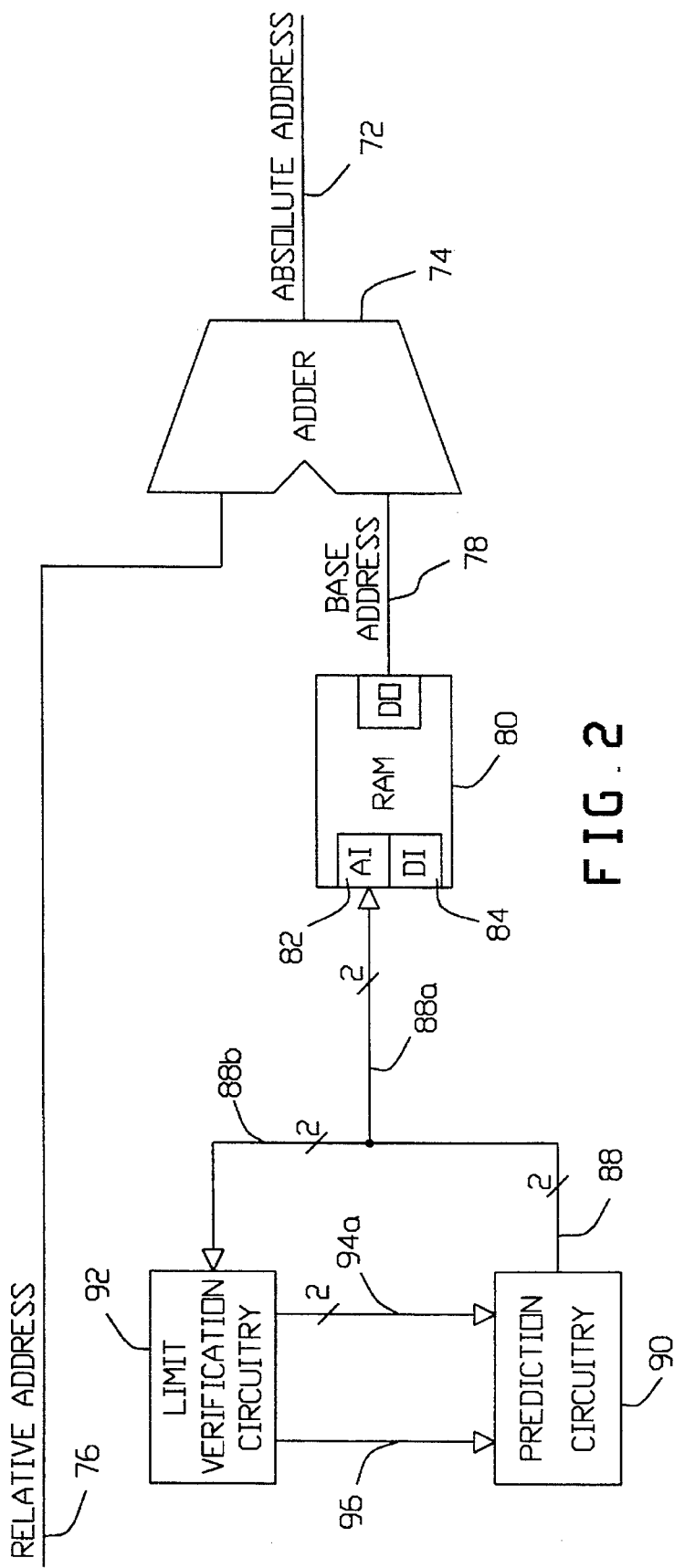

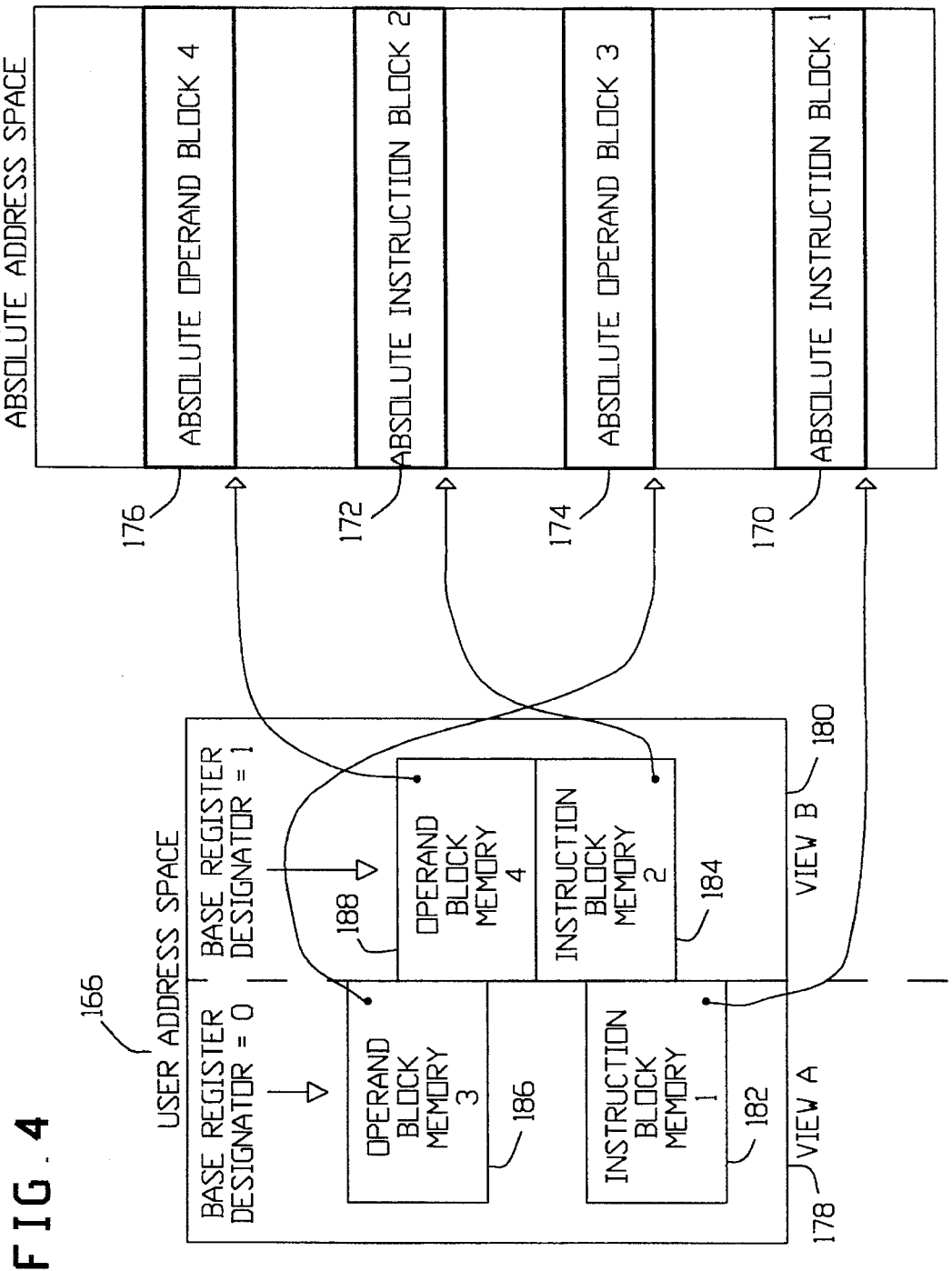

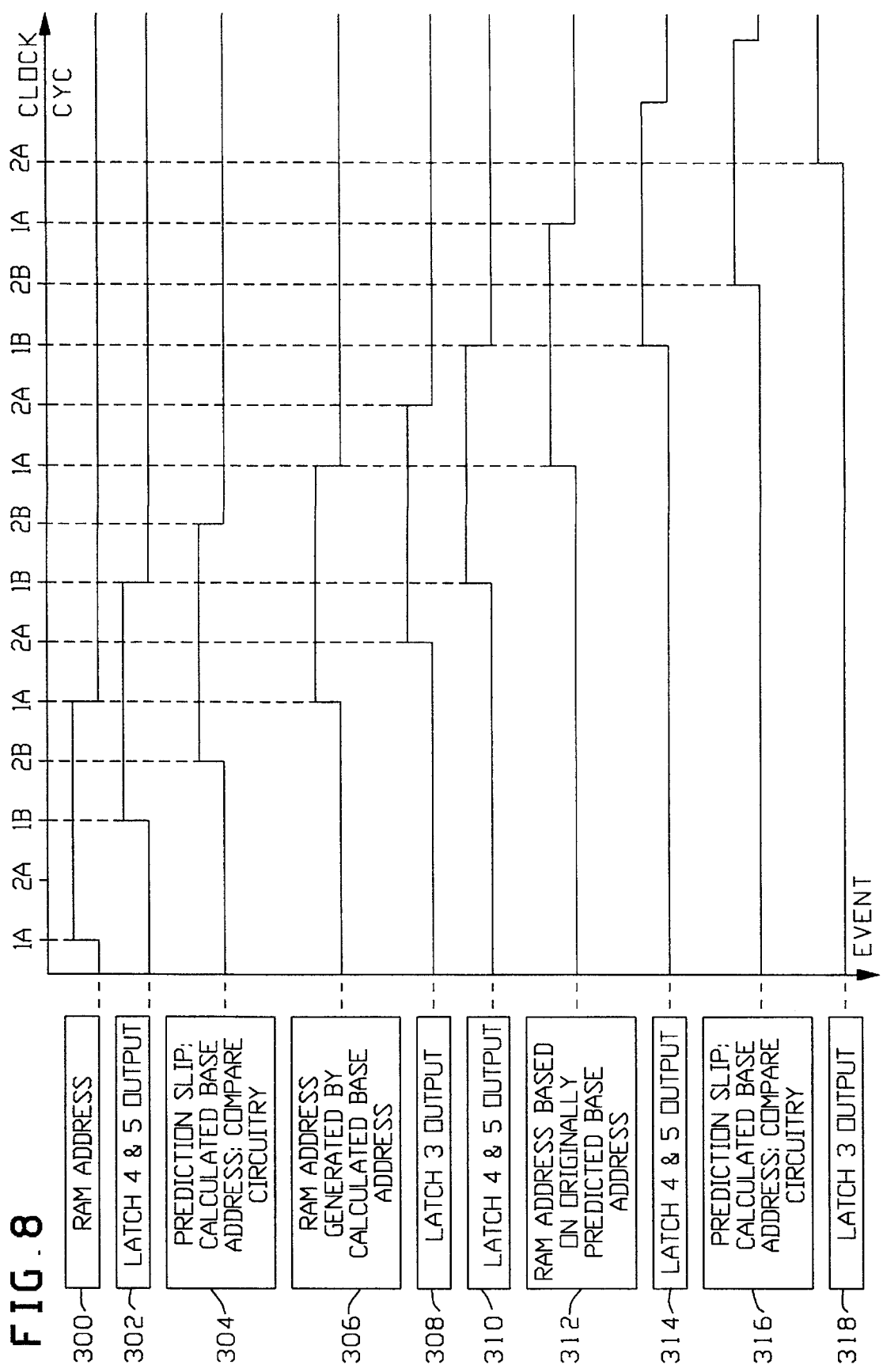

ADDRESS PREDICTION FOR RELATIVE-TO-ABSOLUTE ADDRESSING

BACKGROUND OF THE INVENTION

1. Field of the Invention

This invention relates to the mapping of data in relative address space into absolute address memory, and more particularly to the prediction of the absolute address segment in which the relative address data will be stored.

2. Description of the Prior Art

The memory required by modern data processing systems can be immense. In order to address all address locations within a memory, sufficient addressing bits must be provided to address the entire memory space. The number of address bits required is therefore directly proportional to the amount of memory desired. These address bits are typically part of a machine instruction, and comprise the address field of that instruction. In many data processing systems, more absolute address space exists in the system than can actually be addressed by a particular instruction, due to constraints on the number of bits in the instruction set. In order to avoid this problem, "relative addressing" can be used.

A relative address is the address formulated by determining the difference between a desired address and a known base or reference address. When the relative address is combined with the known base address, the absolute address may be accessed. The relative address may be part of the machine instruction where the absolute address could not, since the relative address requires fewer bits than the address of the resulting absolute address.

Where relative addressing is used, only a portion of the absolute address space may be accessed for a given base address. This is because the base address, which comprises a predetermined number of address bits, is a constant. For instance, for a thirty-two bit absolute address in which the base address comprises the least significant ten bits, only $2^{10}$ address locations (1024 address locations) can be accessed by the base address. If the relative address only contains six bits, then $2^{10}$ plus $2^6$ absolute address locations (1,088 address locations) can be accessed. However, the absolute address space contains $2^{32}$ address locations ($4.3 \times 10^9$ address locations). As can be seen, only 1,088 of $4.3 \times 10^9$ address locations can be accessed using the given ten bit base address and a six bit base address. It may be desirable to only access contiguous address locations within a particular block of absolute memory space. Relative addressing will allow such a block to be accessed. Therefore, in order to access the remaining portion of the absolute memory space, additional base addresses are required.

The use of multiple base addresses will allow various blocks of absolute memory to be accessed. However, it must then be decided which of the base addresses is to be used in conjunction with the relative address to generate the absolute address. An absolute address could be calculated for each base address, but this requires separate adding circuitry for each base address used, and also requires multiplexing of these large generated addresses to choose the desired absolute addresses. This also increases the power consumption of the system. In order to avoid this problem, the present invention utilizes only one adding circuit, and selects one base address to be combined with the relative address to produce the absolute address.

The base address can be selected by comparing the relative address to predetermined base address boundaries. However, the present invention allows for the base address to be predicted, which decreases the time required to generate the absolute address. The prediction method used is based on the trend of recent base address selections, rather than overall statistical predictions. By following the trend of recent base address selections, memory activity such as data block transfers are predicted with greater accuracy than with overall statistical predictions. This results in an increase in system operating speed.

Therefore, the present invention allows for a reduction in real estate required, since only one adder is used. Accordingly, power consumption is reduced. Furthermore, the improved base prediction method increases system speed.

Objects

It is a primary objective of this invention to provide an improved base address prediction system.

It is another object of the present invention to provide a base address prediction system which increases system speed.

Still another object of the invention is to monitor the quickly generated base address predictions, and to notify the prediction circuitry when the prediction proves to be incorrect.

It is yet another object of the present invention to provide prediction correction by generating the correct base address upon detection of an incorrect base address prediction.

A further object of the invention is to provide a base address prediction system with different prediction methods depending on whether the resulting absolute address will access instructions from the system memory, or will access operands from the system memory.

Other more detailed objectives will become apparent from a consideration of the Drawings and the Detailed Description of the Preferred Embodiment.

SUMMARY OF THE INVENTION

The Address Prediction For Relative-to-Absolute Addressing provides a method of predicting which absolute block of memory in instruction is attempting to access. Multiple blocks of absolute memory exist since a smaller relative address within a program instruction cannot access all of the absolute memory space. Multiple base addresses are provided to access these multiple blocks of absolute memory, where one base address will be selected to be added to the relative address to access one of the blocks of absolute memory. This invention provides a method of predicting which base address is requested by the relative address, where predicting a base address can be accomplished faster than by decoding the relative address to determine the actual base address.

The invention uses a memory device to store the available base addresses. The prediction circuitry will generate a "prediction address" which in turn addresses one of the base addresses in the memory device. The selected base address is then combined with the relative address to access one of the blocks of absolute memory.

The prediction address, which represents the predicted base address, is also sent to verification circuitry. The verification circuitry calculates which base address is actually being called out for use by the relative address. The bits representing the "actual base address" are compared to the "prediction address" by the verification circuitry to determine whether the prediction was correct. This takes place while the prediction address is accessing a base address from the memory device. If the prediction address equals the bits representing the actual base address, no further action will be taken by the verification circuitry, and the base address selected will be valid. If the prediction proves to be incorrect, i.e. the prediction address does not equal the bits which represent the actual base address, the actual base address generated by the verification circuit will be used to access a base address from the memory device, and the base address selected by the incorrect prediction will be nullified.

The verification circuit also generates a prediction error notification upon detection of a prediction address which does not equal the bits representing the actual base address. This prediction error notification is sent to the prediction circuitry so that the prediction circuitry can evaluate whether or not to change its current prediction. The evaluation that takes place is dependent upon whether the relative address within a program instruction is attempting to fetch an instruction or an operand from the system memory.

Where an instruction is being fetched from memory, the prediction address will change to equal the bits representing the actual base address, which were sent to the prediction circuitry from the verification circuitry. The prediction circuitry is notified to change its prediction upon receipt of the prediction error notification. The prediction is changed based on the assumption that a series of instructions fetched from the system memory will be fetched from the same memory block.

Where an operand is being fetched from memory, the prediction address will change to equal the bits representing the actual base address only upon receipt of two consecutive prediction error notifications. Upon failure of the first prediction, the prediction address will not change, although the bits representing the actual base address will be used to address the memory device and retrieve the appropriate base address. Upon failure of a second consecutive prediction, the prediction circuitry change its prediction to equal the bits representing the actual base address. This prediction method was designed based on two proven assumptions. First, block transfers of data continue to draw data from the same memory block. Where two consecutive operand fetches are from the same memory block, there is a likelihood that a block of data is being transferred, and data will continue to be taken from that memory block. Therefore, by changing the prediction address to continue to access this memory block, the predictions will be accurate, and system speed can be increased. A second reason is that an instruction fetch is often immediately followed by one operand fetch or store. If only the last "one" base address was used to predict the next base address, the single operand fetch would cause the prediction circuitry to toggle between an instruction memory block and an operand memory block. This would result in an incorrect prediction for each instruction which operated on an operand. Therefore, two consecutive base addresses were used as the selection criteria.

The prediction theories and associated circuitry of the present invention increase the speed of system memory accesses. The predicted address can immediately access the predicted base address from the memory device. Decoding of the relative address or program instruction expends valuable time. The prediction method of the present invention allows for increased speed through the use of predicted base addresses, but retains the ability to provide accurate base address selections by allowing decoding to select the base address where the prediction has proved to be incorrect.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

BRIEF DESCRIPTION OF THE DRAWINGS

FIG. 2 shows the absolute address generation circuitry used in the present invention;

FIG. 4 shows the relationship of a user program's view of the available address and the system's absolute address space;

FIG. 8 is a timing diagram showing the course of events leading to a base address prediction change.

DETAILED DESCRIPTION OF THE PREFERRED EMBODIMENT

Figure 1:
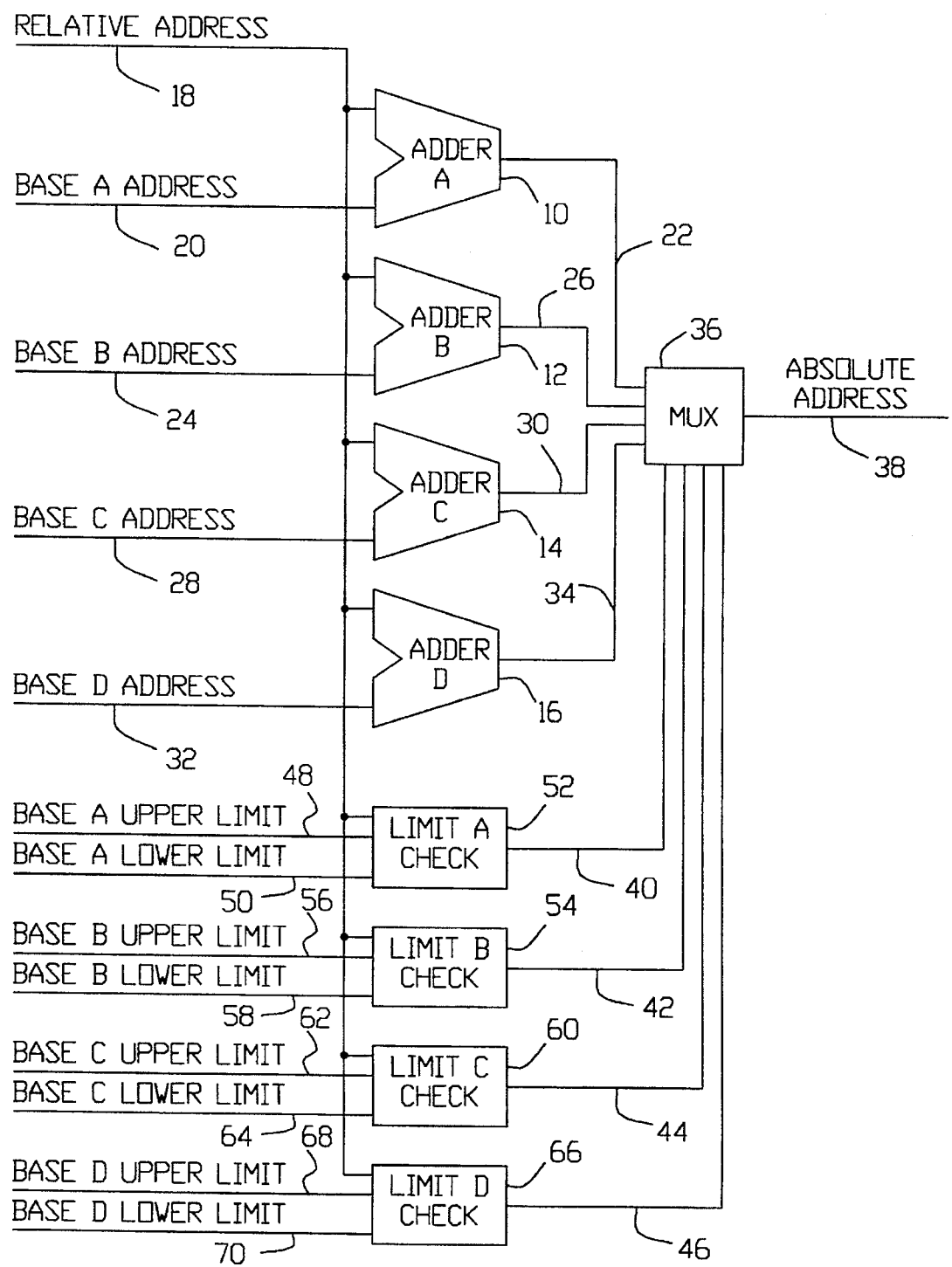
FIG. 1 is a block diagram of a prior art method of generating an absolute address from a base address and a relative address.

FIG. 1 is a block diagram of a prior art method of generating an absolute address from a base address and a relative address. This method generates four separate potential absolute addresses, and selects the appropriate one to use. The design of FIG. 1 requires the use of four separate adder circuits, labeled Adder A 10, Adder B 12, Adder C 14 and Adder D 16. Each adder receives the RELATIVE ADDRESS from Bus 18. The RELATIVE ADDRESS is combined with various base addresses (also referred to as reference addresses) to form the potential absolute addresses. Adder A 10 adds a base address, labeled BASE A ADDRESS on Bus 20, to the RELATIVE ADDRESS to generate the ABSOLUTE ADDRESS A on Bus 22. Adder B 12 adds a base address, labeled BASE B ADDRESS on Bus 24, to the RELATIVE ADDRESS to generate the ABSOLUTE ADDRESS B on Bus 26. Adder C 14 adds a base address, labeled BASE C ADDRESS on Bus 28, to the RELATIVE ADDRESS to generate the ABSOLUTE ADDRESS C on Bus 30. Finally, Adder D 16 adds a base address, labeled BASE D ADDRESS on Bus 32, to the RELATIVE ADDRESS to generate the ABSOLUTE ADDRESS D on Bus 34. One of these generated absolute addresses is then selected by the multiplexer, labeled Mux 36, to generate the ABSOLUTE ADDRESS on Bus 38. A separate adder circuit must be used for each possible base address. Separate base addresses are necessary where the absolute address space is divided to provide distinct blocks of contiguous memory. The blocks of memory are constructed to separate certain data types, such as separating instruction storage areas from operand storage areas.

The absolute addresses supplied on Buses 22, 26, 30 and 34 are selected by Mux 36 through the use of control lines coupled to Mux 36. The control lines are labeled Line 40, Line 42, Line 44 and Line 46, and when activated, will select its corresponding absolute address to be outputted on Bus 38. Line 40 will select ABSOLUTE ADDRESS A on Bus 22, Line 42 will select ABSOLUTE ADDRESS B on Bus 26, Line 44 will select ABSOLUTE ADDRESS C on Bus 30, and Line 46 will select ABSOLUTE ADDRESS D on Bus 34.

In order to determine which control line is to be activated, predetermined upper and lower address limits are compared to the relative address to determine whether the relative address falls within a predetermined range. BASE A UPPER LIMIT on Bus 48 and BASE A LOWER LIMIT on Bus 50 are compared to the RELATIVE ADDRESS on Bus 18 by the Limit A Check 52 circuit. The Limit A Check 52 circuit compares the RELATIVE ADDRESS to the BASE A UPPER LIMIT and the BASE A LOWER LIMIT to see whether the RELATIVE ADDRESS is within the range defined by the upper and lower limits. If it is within those limits, Line 40 will be activated, and the ABSOLUTE ADDRESS A on Bus 22 will be selected by Mux 36 to be outputted on Bus 38 as the selected ABSOLUTE ADDRESS. Similarly, the Limit B Check 54 circuit compares the RELATIVE ADDRESS to the BASE B UPPER LIMIT from Bus 56 and the BASE B LOWER LIMIT from Bus 58. The Limit C Check 60 circuit compares the RELATIVE ADDRESS to the BASE C UPPER LIMIT from Bus 62 and the BASE C LOWER LIMIT from Bus 64. The Limit D Check 66 circuit compares the RELATIVE ADDRESS to the BASE D UPPER LIMIT from Bus 68 and the BASE D LOWER LIMIT from Bus 70. In all cases, if the RELATIVE ADDRESS from Bus 18 is within the predefined limits, the corresponding Limit Check circuit will activate its associated control line, and select the desired absolute address.

The problem with such a system is that it requires a separate adding circuit for each base address, and a multiplexer to select the appropriate generated absolute address. This consumes a great deal of valuable silicon real estate, since the multiplexer and adders are dealing with large addresses. Furthermore, the extra circuitry increases the total power consumption of the system.

FIG. 2 shows the absolute address generation circuitry used in the present invention. The ABSOLUTE ADDRESS on Bus 72 can be generated using only one adding circuit, labeled Adder 74. The Adder 74 adds the RELATIVE ADDRESS on Bus 76 to the BASE ADDRESS on Bus 78. The difference between the present invention and the prior art of FIG. 1 is that a separate absolute address is not generated for each base address used. Instead, the Adder 74 adds the RELATIVE ADDRESS to one selected BASE ADDRESS, which is generated in one of two ways. The first method of generating the BASE ADDRESS on Bus 78 is by predicting which base address the particular program instruction will require access to. The second method utilizes an address-limit-checking scheme to provide the base address where the first method's prediction proved to be incorrect.

The circuitry of FIG. 2 provides the means for selecting the BASE ADDRESS on Bus 78, whether the address prediction method or the address-limit-checking method is used to select a base address. The RAM 80 is a memory device which stores all possible base addresses. A particular base address is retrieved from the RAM 80 by addressing the RAM via the Address Inputs labeled AI 82. The RAM 80 also shows Data Inputs, labeled DI 84, which are used to initially store the base addresses. The Data Outputs, labeled DO 86, provide the data output registers from the RAM 80 to output the BASE ADDRESS on Bus 78.

The address sent to the AI 82 inputs of the RAM 80 is sent via Bus 88a, and called the RAM ADDRESS. In the preferred embodiment, only four base addresses were required, and therefore only two address lines were required. In one embodiment of the invention, more than two address lines were used to address the base addresses from the RAM 80, but only the two address bits on Bus 88a actually change. The rest of the address bits are fixed. This allows any area of the RAM 80 to be used to store the base addresses, since the fixed address bits are determined by the user. The two address bits on Bus 88a are the least significant bits of this concatenated address, and still allow four base addresses to be retrieved from the RAM 80. Since any fixed address bits can be combined with the address bits on Bus 88a, these fixed bits are irrelevant for purposes of describing the invention. Therefore, this description will only make reference to the two relevant address bits on Bus 88a.

The Prediction Circuitry 90 of FIG. 2 will predict a base address to be selected from the RAM 80. This prediction is based on the history of recent base address utilization. Base address prediction allows the ABSOLUTE ADDRESS on Bus 72 to be generated quickly. When the Prediction Circuitry 90 has determined which base address should be used, a two-bit address is outputted on Bus 88, which supplies the Address Inputs AI 82 with the two-bit address via Bus 88a. These two bits, referred to as the RAM ADDRESS, are also sent to the Limit Verification Circuitry 92 via Bus 88b. The Limit Verification Circuitry 92 determines through hardware which base address should "actually" be used, in case the prediction of the Prediction Circuitry 90 proves to be incorrect. The Limit Verification Circuitry 92 makes this determination at the same time that the Prediction Circuitry 90 is predicting a base address. However, it is faster to predict the base address than it is to determine the "actual" base address byway of the Limit Verification Circuitry 92. This is why the predicted base address is used to address the RAM 80. The Limit Verification Circuitry 92 receives the predicted two-bit address from Bus 88b, and compares its calculated base address selection bits with the predicted base address selection bits. If the values are equal, the Prediction Circuitry 90 was successful in predicting the proper base address to be addressed at the RAM 80, and the ABSOLUTE ADDRESS on Bus 72 is valid. If the values are not equal, the ABSOLUTE ADDRESS on Bus 72 is voided, and the Limit Verification Circuitry 92 sends the correct base address selection bits, called the CALCULATED BASE ADDRESS, to the Prediction Circuitry 90 via Bus 94a. These bits are then sent from the Prediction Circuitry 90 to the AI 82 inputs of the RAM 80 via Buses 88 and 88a to retrieve the correct BASE ADDRESS on Bus 78. The Prediction Circuitry 90 selects either its predicted base address selection bits or the Limit Verification Circuitry's 92 generated base address selection bits, depending upon the state of the PREDICTION SLIP signal on Line 96. The operation of the Limit Verification Circuitry 92 and the Prediction Circuitry 90 are discussed in more detail in the description of FIG. 3 and FIG. 6 respectively.

Figure 3A:
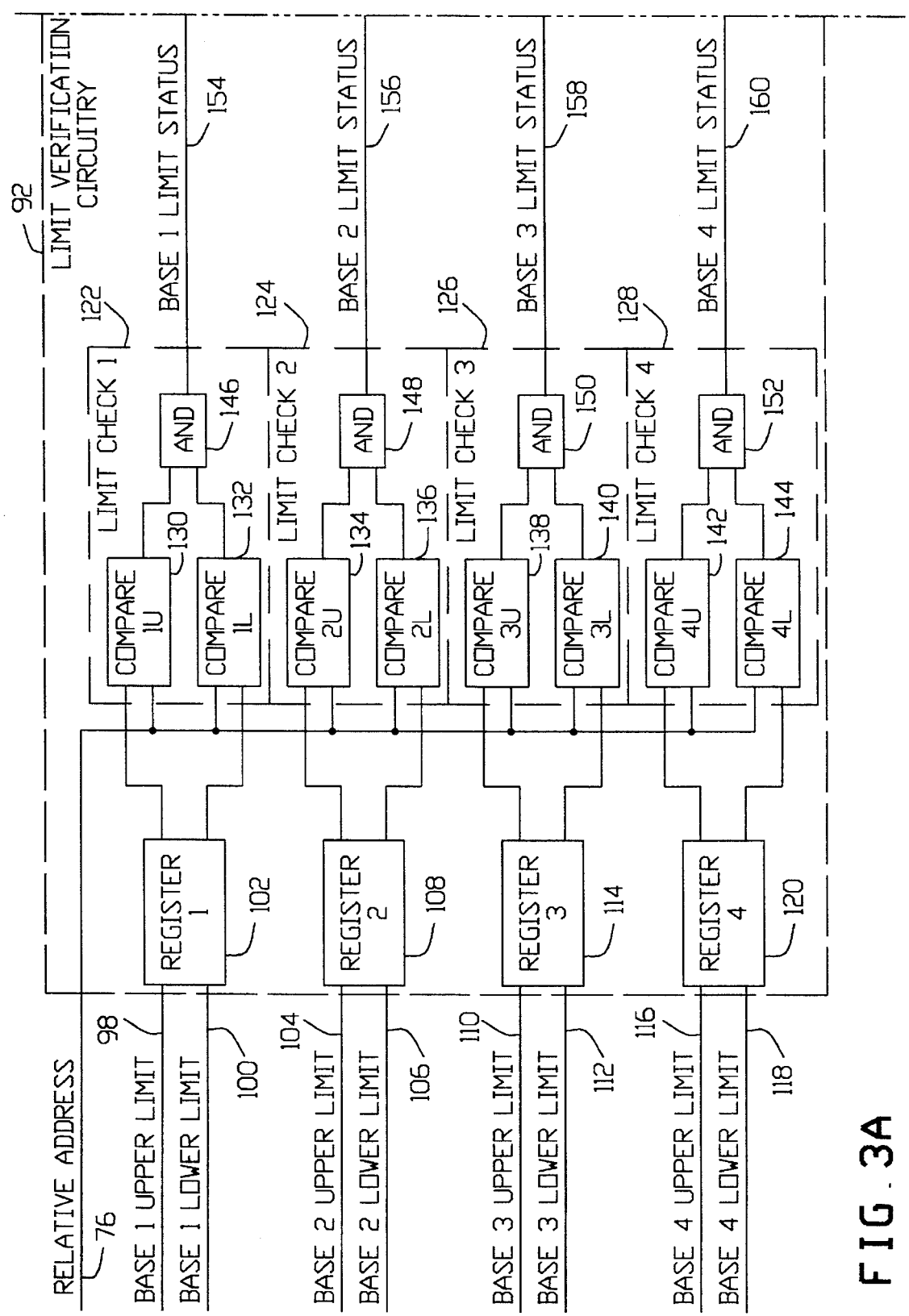
FIG. 3 includes FIG. 3A and FIG. 3B positioned as shown, and illustrates a composite logic diagram of the Limit Verification Circuitry.
Figure 3B:
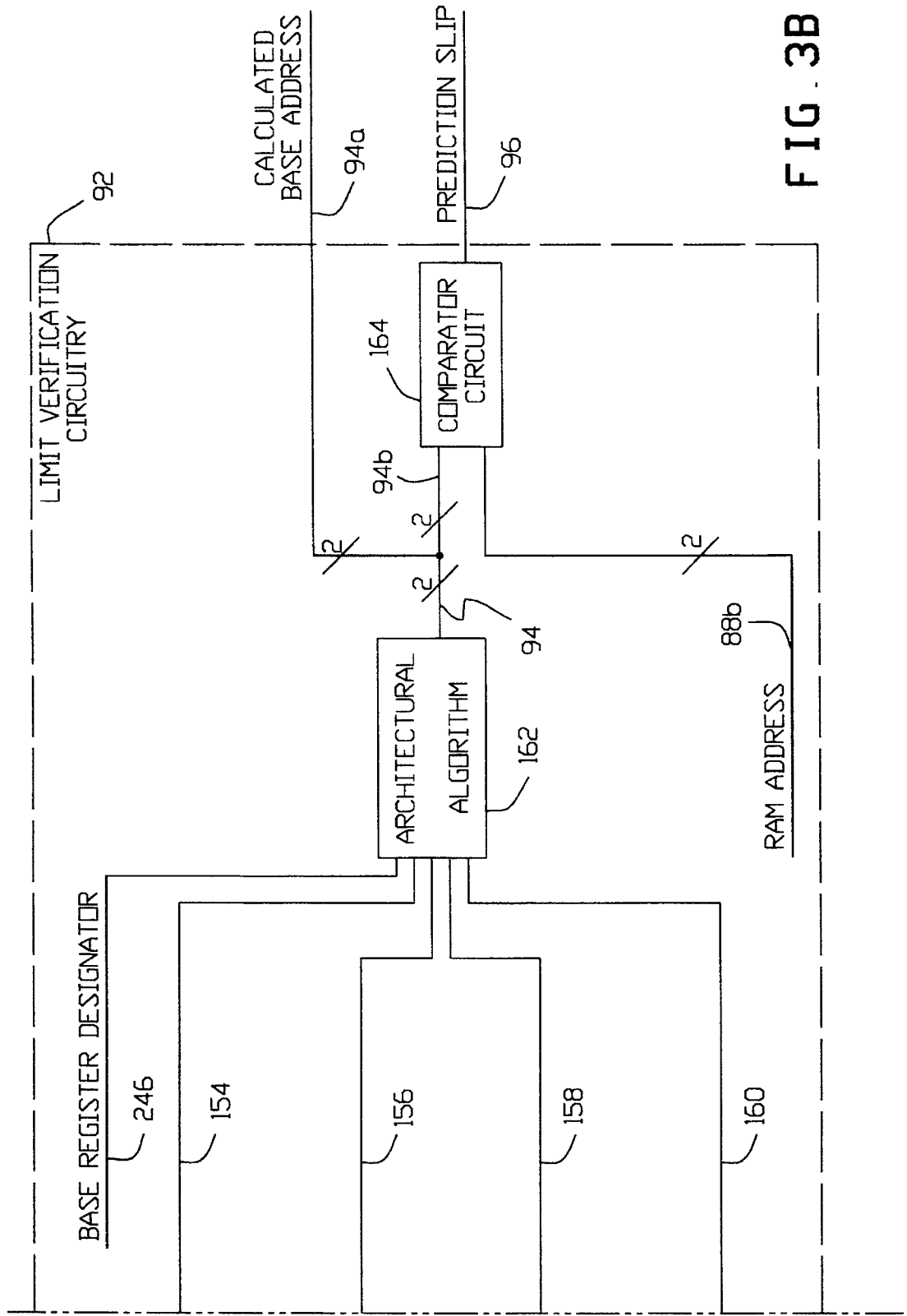

FIG. 3 includes FIG. 3A and FIG. 3B positioned as shown, and illustrates a composite logic diagram of the Limit Verification Circuitry 92. The RELATIVE ADDRESS on Bus 76 is compared to various base address limits to see whether the RELATIVE ADDRESS is within the range of a particular block of memory at a given base address. These ranges are defined by an upper and lower offset limit which represent an offset from a given base address. For example, a lower offset limit of 0 and an upper offset of 100 for a base address of 2000 would define a block of memory between address location 2000 and 2100. Since the RELATIVE ADDRESS is also an offset to a base address, it can be compared to these offset limits to determine whether the RELATIVE ADDRESS falls within the upper and lower offset limits. The reason for comparing the upper and lower offset limits to the RELATIVE ADDRESS is to determine whether the RELATIVE ADDRESS "could be" associated with the base address whose limits are defined by those upper and lower offset limits. This will become more evident as the Limit Verification Circuitry 92 is described in greater detail.

In the preferred embodiment, four base registers were implemented to provide for four memory blocks within the absolute memory space of the system. Therefore, four sets of upper and lower offset limits are required. The first set of limits consists of the BASE 1 UPPER LIMIT on Bus 98 and the BASE 1 LOWER LIMIT on Bus 100. These limits are latched in REGISTER 1 102. The next set of limits consists of the BASE 2 UPPER LIMIT on Bus 104 and the BASE 2 LOWER LIMIT on Bus 106, which are latched in REGISTER 2 108. The third set of limits includes the BASE 3 UPPER LIMIT on Bus 110 and the BASE 3 LOWER LIMIT on Bus 112, which are latched in REGISTER 3 114. Finally, the fourth set of limits consists of the BASE 4 UPPER LIMIT on Bus 116 and the BASE 4 LOWER LIMIT on Bus 118, which are latched in REGISTER 4 120.

Each of the registers are coupled to a limit checking circuit, so that the upper and lower offset limits can be compared to the RELATIVE ADDRESS from Bus 76. The Limit Check 1 122 circuit receives the BASE 1 UPPER LIMIT (on Bus 98) and the BASE 1 LOWER LIMIT (on Bus 100) from Register 1 102. The Limit Check 2 124 circuit receives the BASE 2 UPPER LIMIT (on Bus 104) and the BASE 2 LOWER LIMIT (on Bus 106) from Register 2 108. The Limit Check 3 126 circuit receives the BASE 3 UPPER LIMIT (on Bus 110) and the BASE 3 LOWER LIMIT (on Bus 112) from Register 3 114. The Limit Check 4 128 circuit receives the BASE 4 UPPER LIMIT (on Bus 116) and the BASE 4 LOWER LIMIT (on Bus 118) from Register 4 120. The Limit Check circuits compare the RELATIVE ADDRESS from Bus 76 to the upper and lower offset limits of each block of memory defined by those limits. For instance, the Limit Check 1 122 circuit determines whether the RELATIVE ADDRESS from Bus 76 is within the range delineated by the BASE 1 UPPER LIMIT on Bus 98 and the BASE 1 LOWER LIMIT on Bus 100. Limit Check 2 124, Limit Check 3 126, and Limit Check 4 128 perform like comparisons for their associated upper and lower offset limits.

Within each Limit Check circuit, there exists two comparing circuits; one to compare the RELATIVE ADDRESS to the upper offset limit, and the other to compare the RELATIVE ADDRESS to the lower offset limit. The Compare 1U 130 and Compare 1L 132 circuits are coupled to Register 1 102 to receive the BASE 1 UPPER LIMIT on Bus 98 and the BASE 1 LOWER LIMIT on Bus 100 respectively. Similarly, the Compare 2U 134 and Compare 2L 136 circuits are coupled to Register 2 108, the Compare 3U 138 and Compare 3L 140 circuits are coupled to Register 3 114, and the Compare 4U 142 and Compare 4L 144 circuits are coupled to Register 4 120.

Also within each Limit Check circuit is an "and" function, to determine whether the RELATIVE ADDRESS on Bus 76 is within both the upper and lower offset limits. The AND 146 circuit of Limit Check 1 122 is coupled to Compare 1U 130 and Compare 1L 132. The AND 148 circuit of Limit Check 2 124 is coupled to Compare 2U 134 and Compare 2L 136. The AND 150 circuit of Limit Check 3 126 is coupled to Compare 3U 138 and Compare 3L 140. Finally, the AND 152 circuit of Limit Check 4 128 is coupled to Compare 4U 142 and Compare 4L 144.

The Limit Check 1 122, 2 124, 3 126, and 4 128 circuits work as follows. Looking first to Limit Check 1 122, the Compare 1U 130 circuit will determine whether the RELATIVE ADDRESS from Bus 76 is less than or equal to the BASE 1 UPPER LIMIT on Bus 98. The Compare 1L 132 circuit will simultaneously determine whether the RELATIVE ADDRESS is greater than or equal to the BASE 1 LOWER LIMIT on Bus 100. If both of these conditions are met, the RELATIVE ADDRESS is within the boundaries defining the memory block beginning at a first base register, which can be referred to as Base 1. The BASE 1 LIMIT STATUS on Line 154 from AND 146 will indicate whether or not both conditions were met. Limit Check 2 124, Limit Check 3 126, and Limit Check 4 128 work identical to that of Limit Check 1 122, and generate the BASE 2 LIMIT STATUS signal on Line 156, the BASE 3 LIMIT STATUS signal on Line 158, and the BASE 4 LIMIT STATUS signal on Line 160.

The Base Limit Status signals on Lines 154, 156, 158 and 160 therefore indicate that the RELATIVE ADDRESS from Bus 76 is within a predefined memory block. However, it is possible that the RELATIVE ADDRESS falls with more than one predefined memory block, in which case more than one of the BASE LIMIT STATUS signals on Lines 154, 156, 158 and 160 will be active. For instance, if all four predefined memory blocks were identical in size, the upper and lower limits would be identical, and all four BASE LIMIT STATUS signals would be activated. The Limit Check 1 122, 2 124, 3 126 and 4 128 circuits therefore only "partially" determine which base register the RELATIVE ADDRESS should be added to in order to generate the ABSOLUTE ADDRESS on Bus 72. Where more than one BASE LIMIT STATUS signal is active, something must choose one of the possible base registers. In the preferred embodiment, an Architectural Algorithm 162 was developed to perform the actual selection of one base register to be used. The Architectural Algorithm 169 will select a base register to be used, and will output a two-bit RAM 80 address for this base register on Bus 94, which is shown as the CALCULATED BASE ADDRESS on Bus 94a. This two-bit address is also sent to the Comparator Circuit 164 via Bus 94b, to be compared to the RAM ADDRESS on Bus 88b. The RAM ADDRESS is the address to the RAM 0 for the "predicted" base address. If these two-bit addresses are not equal, the Comparator Circuit 164 will output an active PREDICTION SLIP signal on Line 96. This signal is sent to the Prediction Circuitry 90, and will be discussed in further detail with the description of FIG. 6.

The process of selecting a base register in the preferred embodiment through the use of the Architectural Algorithm 169 assumes that blocks of memory will be divided between blocks that will store instructions, and blocks that will store operands. The exact process used in determining which base address is selected is not critical, as long as the process is used consistently. In other words, the user may define a first block of memory to be used to store a certain type of data, but this block of data should consistently store that type of data. The method used to select a base address in the preferred embodiment of the invention is not relevant to the present invention, but is nevertheless described in FIG. 4 and FIG. 5.

FIG. 4 shows the relationship of a user program's view of the available address and the system's absolute address space. The User Address Space 166 represents the user program's view of the available address space. The diagram shows how the User Address Space is mapped into the Absolute Address Space 168 of the computer system.

The large Absolute Address Space 168 can be divided into distinct memory blocks. In the preferred embodiment, four memory blocks were used within the Absolute Address Space 168. These include the Absolute Instruction Block 1 170, the Absolute Instruction Block 2 172, the Absolute Operand Block 3 174, and the Absolute Operand Block 4 176. The "instruction" blocks (Absolute Instruction Block 1 170 and Absolute Instruction Block 2 172) represent memory areas set aside to normally store program instructions. The "operand" blocks (Absolute Operand Block 3 174 and Absolute Operand Block 4 176) normally store operands.

The Architectural Algorithm 162 used in the Limit Verification Circuitry 92 uses a BASE REGISTER DESIGNATOR to specify a particular "view" of the User Address Space 166. In View A 178 of FIG. 4, the BASE REGISTER DESIGNATOR is equal to zero. In View B 180, the BASE REGISTER DESIGNATOR is equal to one. Therefore, one relative address may be mapped into one of two absolute memory blocks, depending on the state of the BASE REGISTER DESIGNATOR BIT. The Instruction Block Memory 1 182 represents the User Address Space 166 for the block of memory defined by the BASE 1 UPPER LIMIT on Bus 98 and the BASE 1 LOWER LIMIT on Bus 100. The Instruction Block Memory 2 184 represents the User Address Space 166 for the block of memory defined by the BASE 2 UPPER LIMIT on Bus 104 and the BASE 2 LOWER LIMIT on Bus 106. The Operand Block Memory 3 186 represents the User Address Space 166 for the block of memory defined by the BASE 3 UPPER LIMIT on Bus 110 and the BASE 3 LOWER LIMIT on Bus 112. Finally, the Operand Block Memory 4 188 represents the User Address Space 166 for the block of memory defined by the BASE 4 UPPER LIMIT on Bus 116 and the BASE 4 LOWER LIMIT on Bus 118.

The Architectural Algorithm 162 will map instructions into Absolute Instruction Block 1 170 or Absolute Instruction Block 2 172, depending on the state of the BASE REGISTER DESIGNATOR. The BASE REGISTER DESIGNATOR is simply a bit stored in a register which represents which "view" of memory is desired. Memory access to or from the Instruction Block Memory 1 182 (and thus Absolute Instruction Block 1 170) occurs when an instruction is being written or read, and the BASE REGISTER DESIGNATOR is equal to zero. Memory access to or from the Instruction Block Memory 2 184 (and thus Absolute Instruction Block 2 172) occurs when an instruction is being written or read, and the BASE REGISTER DESIGNATOR is equal to one. Memory access to or from the Operand Block Memory 3 186 (and thus Absolute Operand Block 3 174) occurs when an operand is being written or read, and the BASE REGISTER DESIGNATOR is equal to zero. Memory access to or from the Operand Block Memory 4 188 (and thus Absolute Operand Block 4 176) occurs when an operand is being written or read, and the BASE REGISTER DESIGNATOR is equal to one. Where the BASE REGISTER DESIGNATOR is at one value, but a memory block from the other "view" is desired, a "jump" instruction is executed which is beyond the boundary limits of the block of memory within the current view, but within the boundary limits of the opposite view. This automatically causes the BASE REGISTER DESIGNATOR to switch values. For example, if the BASE REGISTER DESIGNATOR is currently set to a zero, and an operand fetch is desired from Operand Block Memory 4 188, a "jump" instruction is executed which is beyond the address limits of Operand Block Memory 3 186, but is still within the address limits of Operand Block Memory 4 188. This will cause the BASE REGISTER DESIGNATOR to switch to a one (high logic level), and Operand Block Memory 4 188 can then be accessed. This can be more easily seen by the flowchart of FIG. 5.

Figure 5:
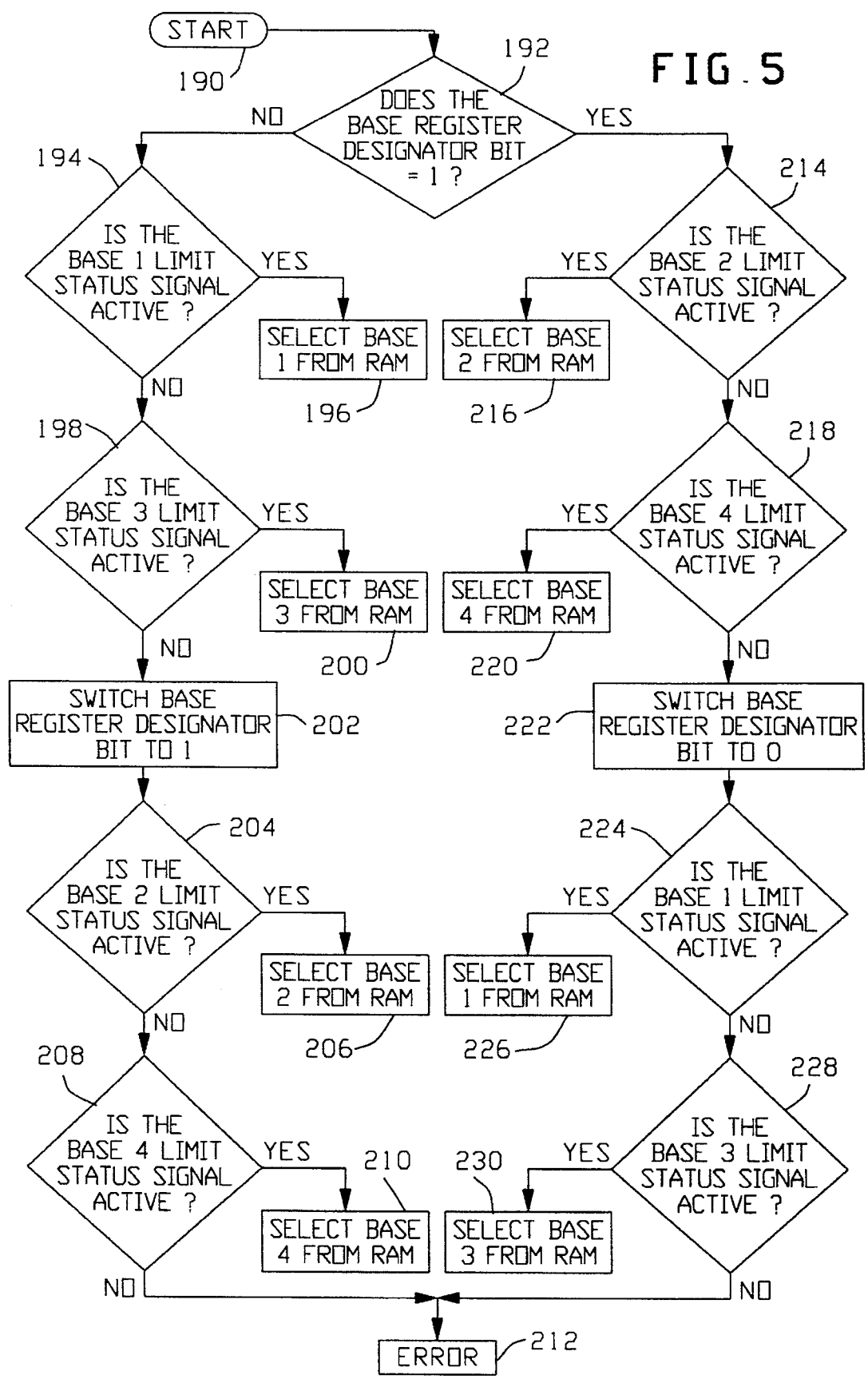
FIG. 5 is a flow diagram showing execution of the Architectural Algorithm.

FIG. 5 is a flow diagram showing execution of the Architectural Algorithm 162. Processing begins at Start Step 190. The BASE REGISTER DESIGNATOR is checked to determine whether it is a binary one or zero at Decision Step 192. If the BASE REGISTER DESIGNATOR bit is equal to zero, Decision Step 194 determines whether the BASE 1 LIMIT STATUS signal on Line 154 of the Limit Verification Circuitry 92 has been activated. This determines whether the RELATIVE ADDRESS on Bus 76 is within the range defined by the BASE 1 UPPER LIMIT on Bus 98 and the BASE 1 LOWER LIMIT on Bus 100. If the BASE 1 LIMIT STATUS signal is active, then BASE 1 is selected at Step 196, and a two-bit address to select BASE 1 is outputted from the Limit Verification Circuitry 92 as the CALCULATED BASE ADDRESS on Bus 94*a*. If the BASE 1 LIMIT STATUS signal is not active, then the BASE 3 LIMIT STATUS signal is checked to determine whether it is active at Decision Step 198. This determines whether the RELATIVE ADDRESS on Bus 76 is within the range defined by the BASE 3 UPPER LIMIT on Bus 110 and the BASE 3 LOWER LIMIT on Bus 122. If the BASE 3 LIMIT STATUS is active, then BASE 3 is selected at Step 200, and a two-bit address to select BASE 3 is outputted from the Limit Verification Circuitry 92 as the CALCULATED BASE ADDRESS on Bus 94*a*. If the BASE 3 LIMIT STATUS signal is not active, then Step 202 indicates that the BASE REGISTER DESIGNATOR bit is switched to a binary one.

Once the BASE REGISTER DESIGNATOR bit is switched to a binary one, processing continues at Decision Step 204, where the BASE 2 LIMIT STATUS signal is checked to determine whether it is active. This determines whether the RELATIVE ADDRESS on Bus 76 is within the range defined by the BASE 2 UPPER LIMIT on Bus 104 and the BASE 2 LOWER LIMIT on Bus 106. If the BASE 2 LIMIT STATUS signal is active, then BASE 2 is selected at Step 206, and a two-bit address to select BASE 2 is outputted from tile Limit Verification Circuitry 92 as the CALCULATED BASE ADDRESS on Bus 94*a*. If the BASE 2 LIMIT STATUS signal is not active, then the BASE 4 LIMIT STATUS signal is checked to determine whether it is active at Decision Step 208. This determines whether the RELATIVE ADDRESS on Bus 76 is within the range defined by the BASE 4 UPPER LIMIT on Bus 116 and the BASE 4 LOWER LIMIT on Bus 118. If the BASE 4 LIMIT STATUS is active, then BASE 4 is selected at Step 210, and a two-bit address to select BASE 4 is outputted from the Limit Verification Circuitry 92 as the CALCULATED BASE ADDRESS on Bus 94*a*. If the BASE 4 LIMIT STATUS signal is not active, then Step 212 indicates that the an error has occurred, since the RELATIVE ADDRESS on Bus 76 did not fit into any base address range.

Returning to Decision Step 192, if the BASE REGISTER DESIGNATOR bit is equal to one, Decision Step 214 determines whether the BASE 2 LIMIT STATUS signal on Line 156 of the Limit Verification Circuitry 92 has been activated. This determines whether the RELATIVE ADDRESS on Bus 76 is within the range defined by the BASE 2 UPPER LIMIT on Bus 104 and the BASE 2 LOWER LIMIT on Bus 106. If the BASE 2 LIMIT STATUS signal is active, then BASE 2 is selected at Step 216, and a two-bit address to select BASE 2 is outputted from the Limit Verification Circuitry 92 as the CALCULATED BASE ADDRESS on Bus 94a. If the BASE 2 LIMIT STATUS signal is not active, then the BASE 4 LIMIT STATUS signal is checked to determine whether it is active at Decision Step 218. This determines whether the RELATIVE ADDRESS on Bus 76 is within the range defined by the BASE 4 UPPER LIMIT on Bus 116 and the BASE 4 LOWER LIMIT on Bus 118. If the BASE 4 LIMIT STATUS is active, then BASE 4 is selected at Step 220, and a two-bit address to select BASE 4 is outputted from the Limit Verification Circuitry 92 as the CALCULATED BASE ADDRESS on Bus 94a. If the BASE 4 LIMIT STATUS signal is not active, then Step 222 indicates that the BASE REGISTER DESIGNATOR bit is switched to a binary zero.

Once the BASE REGISTER DESIGNATOR bit is switched to a binary zero, processing continues at Decision Step 224, where the BASE 1 LIMIT STATUS signal is checked to determine whether it is active. This determines whether the RELATIVE ADDRESS on Bus 76 is within the range defined by the BASE 1 UPPER LIMIT on Bus 98 and the BASE 1 LOWER LIMIT on Bus 100. If the BASE 1 LIMIT STATUS signal is active, then BASE 1 is selected at Step 226, and a two-bit address to select BASE 1 is outputted from the Limit Verification Circuitry 92 as the CALCULATED BASE ADDRESS on Bus 94a. If the BASE 1 LIMIT STATUS signal is not active, then the BASE 3 LIMIT STATUS signal is checked to determine whether it is active at Decision Step 228. This determines whether the RELATIVE ADDRESS on Bus 76 is within the range defined by the BASE 3 UPPER LIMIT on Bus 110 and the BASE 3 LOWER LIMIT on Bus 112. If the BASE 3 LIMIT STATUS is active, then BASE 3 is selected at Step 230, and a two-bit address to select BASE 3 is outputted from the Limit Verification Circuitry 92 as the CALCULATED BASE ADDRESS on Bus 94a. If the BASE 3 LIMIT STATUS signal is not active, then Step 212 indicates that the an error has occurred, since the RELATIVE ADDRESS on Bus 76 did not fit into any base address range.

Such an algorithm is not essential to operation of the invention. FIGS. 4 and 5 represent one method of calculating a base address to ultimately be used if the Prediction Circuitry 90 proves to predict incorrectly. What is important is that a method or pattern be chosen for selecting a CALCULATED BASE ADDRESS on Bus 94a from the BASE 1 LIMIT STATUS on Line 154, the BASE 2 LIMIT STATUS on Line 156, the BASE 3 LIMIT STATUS on Line 158, and the BASE 4 LIMIT STATUS on Line 160. In this way, a CALCULATED BASE ADDRESS will be available where the Prediction Circuitry 90 does not correctly predict the base address for which the ABSOLUTE ADDRESS on Bus 72 will be generated.

Figure 6:
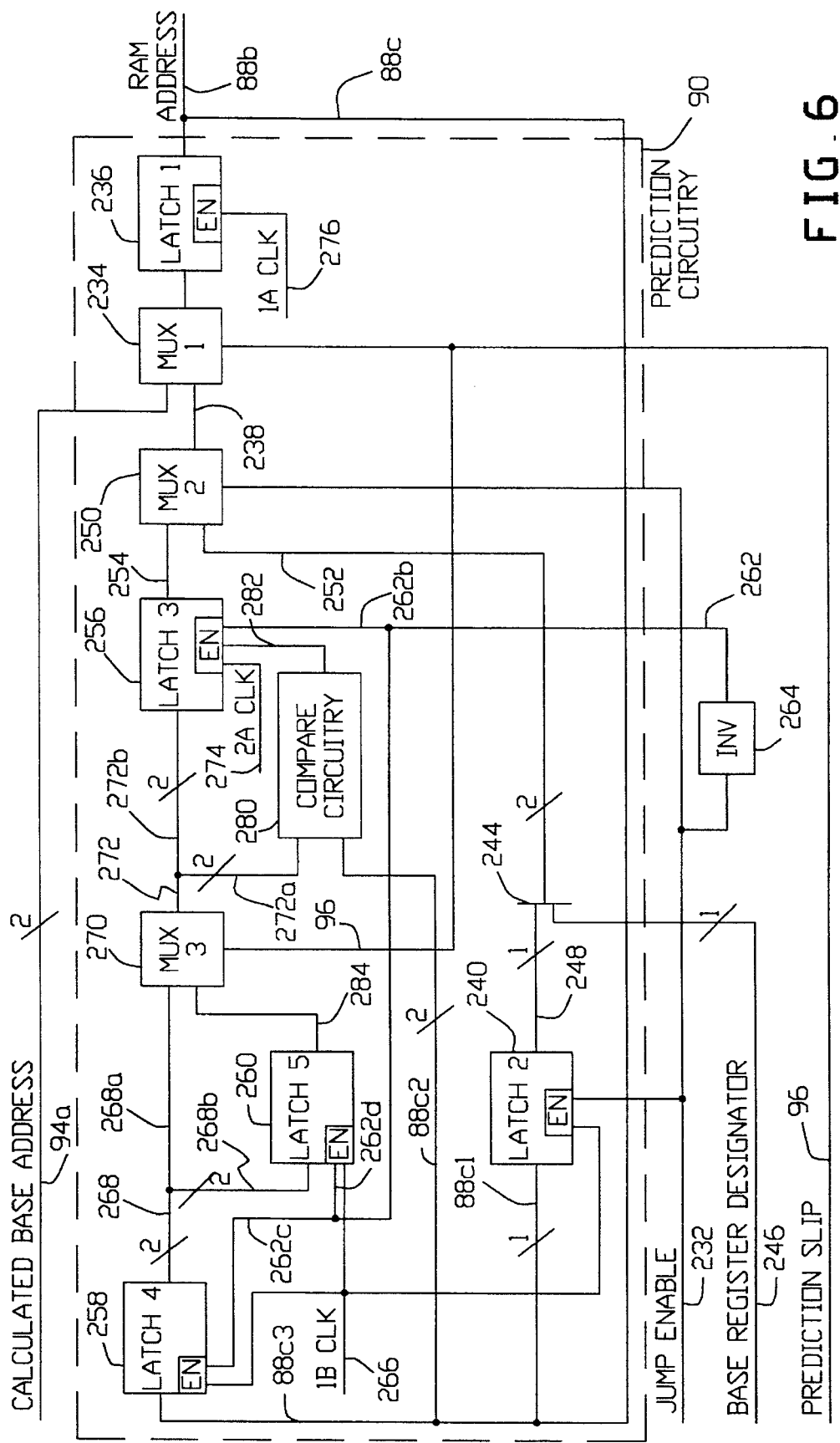
FIG. 6 is a block diagram of the Prediction Circuitry and its associated inputs and outputs.

FIG. 6 is a block diagram of the Prediction Circuitry 90 and its associated inputs and outputs. The Prediction Circuitry 90 of the preferred embodiment will predict which one of the four base registers the RELATIVE ADDRESS (on Bus 76) is to be added to in order to generate the ABSOLUTE ADDRESS (on Bus 72). The Prediction Circuitry 90 predicts in two different ways, depending on whether the program instruction is requesting an instruction fetch or an operand fetch.

The program instructions requesting operand or instruction fetches have operation codes which indicate what type of function is to be performed. Instruction decode circuitry, which is known in the art, determines whether this operation code is requesting that an operand be fetched, or an instruction be fetched. When a request for an instruction fetch occurs, the program instruction is attempting to access a subroutine or branch to a different group of instructions, which means that a "jump" instruction has occurred. Therefore, the instruction decode circuitry is monitoring for an operation code which reflects either an operand fetch, or a "jump" instruction. When the instruction decode circuitry determines that a "jump" instruction to a block of memory is to occur, the JUMP ENABLE signal on Line 232 is activated. The JUMP ENABLE signal will be described in more detail later in this specification.

Generation of the PREDICTION SLIP signal on Line 96 was described in the description of FIG. 3. The Comparator Circuit 164 within the Limit Verification Circuitry 92 of FIG. 3 compares the CALCULATED BASE ADDRESS on Bus 94a with the RAM ADDRESS on Bus 88b. The RAM ADDRESS can also be seen as the output of the Prediction Circuitry of FIG. 6. The RAM ADDRESS is the two-bit address which selects a base address stored in the RAM 80. The RAM ADDRESS will represent the predicted two-bit address which corresponds to the predicted base address, or it will represent the CALCULATED BASE ADDRESS when the prediction is determined to be incorrect by the Comparator Circuit 164 of FIG. 3. If the predicted RAM ADDRESS on Bus 88b is not equal to the CALCULATED BASE ADDRESS on Bus 94a, the PREDICTION SLIP signal on Line 96 is activated by the Comparator Circuit 164 of FIG. 3. In this case, the RAM ADDRESS on Bus 88b will represent the CALCULATED BASE ADDRESS of Bus 94a. The PREDICTION SLIP signal on Line 96 signals to the Prediction Circuitry 90 that the CALCULATED BASE ADDRESS should be used when the prediction was incorrect. This selection is performed at the multiplexer labeled Mux 1 234. When the PREDICTION SLIP signal on Line 96 is activated, the CALCULATED BASE ADDRESS on Bus 94a is allowed to pass to the Latch 1 236, which then outputs the CALCULATED BASE ADDRESS on Bus 94a as the RAM ADDRESS. When the PREDICTION SLIP signal on Line 96 is not activated, the two-bit address representing the predicted base address on Bus 238 will be selected by Mux 1 234, and will become the RAM ADDRESS on Bus 88b.

As previously mentioned, the Prediction Circuitry 90 predicts in two different ways, depending on whether the program instruction is requesting an instruction fetch or an operand fetch. When an instruction fetch is requested, a "jump" instruction occurred, and the JUMP ENABLE signal on Line 232 is activated. The JUMP ENABLE signal will enable the latch labeled Latch 2 240 to pass one bit from the previous RAM ADDRESS signal on Line 88c1 to Concatenator 244. Only one of the two bits is used, and it is the bit which distinguishes between the Absolute Instruction Blocks (1 170 and 2 172 of FIG. 4) and the Absolute Operand Blocks (3 174 and 4 176 of FIG. 4). Only the Absolute Instruction Blocks will be considered when the JUMP ENABLE signal on Line 232 is activated. The current value of the BASE REGISTER DESIGNATOR on Line 246 will then be concatenated with the signal on Line 88c1. The BASE REGISTER DESIGNATOR determines which of the two memory blocks (Absolute Instruction Block 1 170 or Absolute Instruction Block 2 172) will be accessed. The BASE REGISTER DESIGNATOR switches states according to Architectural Algorithm 162 described in FIG. 5, and will remain in the same state until a "jump" instruction occurs outside the boundaries of the memory blocks within that "view"

The signal on Line 88c1 and the BASE REGISTER DESIGNATOR on Line 246 together make up the new predicted two-bit address for instruction fetching. The "current" BASE REGISTER DESIGNATOR is used as one bit, and the "current" RAM ADDRESS bit on Line 248 is used as the other. The circuit is designed to use the current values as the new predicted values. This is based on the assumption that once an instruction fetch occurs within one memory block, instruction sequencing will continue within that memory block until the subroutine has completed. These two bits from the Concatenator 244 are sent to the multiplexer labeled Mux 2 250 via Bus 252. Since the JUMP ENABLE signal will be active following a "jump" instruction, Mux 2 250 will select the signals on Bus 252. The resulting output of Mux 2 250 is sent to Mux 1 234 via Line 238. As previously described, Mux 1 234 will then select the signals on Bus 238 or the CALCULATED BASE ADDRESS on Bus 94a depending upon the state of the PREDICTION SLIP signal on Line 96. Therefore, if the Comparator Circuit 164 within the Limit Verification Circuitry 92 determines that the prediction was correct, Mux 1 234 will select the predicted signal on Line 238 to be its output. If the Comparator Circuit 164 determines that the prediction was incorrect, Mux 1 234 will select the CALCULATED BASE ADDRESS on Bus 94a to be its output.

From the above description, the advantage of predicting the base address becomes apparent. If the prediction is correct, the RAM ADDRESS on Bus 88b can be immediately used to access a base address from the RAM 80. If the prediction is incorrect, the PREDICTION SLIP signal on Line 96 will enable Mux 1 234 to select the CALCULATED BASE ADDRESS on Bus 94a. However, extra time is spent in "reselecting" the CALCULATED BASE ADDRESS. In the preferred embodiment of the invention, this extra time is one clock cycle. Therefore, without the prediction circuitry, it would take one extra clock cycle for each base address selection. The prediction circuitry therefore reduces the time required to select a base address by one clock cycle each time the prediction proves to be correct.

The second way in which predictions occur is when an operand fetch is requested by the program instruction. When instruction decoding determines from the program instruction that an operand is to be fetched, the JUMP ENABLE signal on Line 232 is inactivated. This disables Latch 2 240, and causes Mux 2 250 to select the signal on Line 254 from Latch 3 256. Latch 3 256 holds the predicted two-bit address which in turn will select a base address from RAM 80. Inactivation of the JUMP ENABLE signal also allows Latch 3 256, Latch 4 258, and Latch 5 260 to operate if all other enable conditions are also met. When the JUMP ENABLE signal is inactivated, the signal from Line 262 is inverted by the inverter labeled INV 264, which supplies the active inverted JUMP ENABLE signal to Latch 3 256, Latch 4 258, and Latch 5 260 via Lines 262b, 262c, and 262d respectively.

Operand memory block prediction is based on the trend of recent base address selections. The circuitry is designed to establish its base address prediction on two consecutive base address selections. This theory was used for two reasons. First, block transfers of data continue to draw data from the same memory block. Where two consecutive operand fetches are from the same memory block, there is a likelihood that a block of data is being transferred, and data will continue to be taken from that memory block. A second reason is that an instruction fetch is often immediately followed by one operand fetch or store. This would occur when a "load", "store", or other instruction which operates on an operand is executed. If only the last "one" base address was used to predict the next base address, these "load" and "store" instructions would be toggling between an instruction memory block and an operand memory block. In the case where only the last "one" base address was used to predict the next base address, an incorrect prediction would occur each time. Therefore, "two" consecutive base addresses were used as the selection criteria.

The first step the Prediction Circuitry 90 takes to predict a base address for an operand fetch is to latch the RAM ADDRESS into Latch 4 258. Latch 4 258 receives the RAM ADDRESS from Bus 88c via its input bus labeled Bus 88c3. Latch 4 258 actually stores the two bits of the RAM ADDRESS when the clock signal, labeled 1B CLK on Line 266, becomes active, and when the inversion of the JUMP ENABLE signal from Line 262c is active. Line 262c is an extension of Line 262, which comes from INV 264. The signal on Bus 268 will be referred to as the LATCHED RAM ADDRESS. Bus 268a transmits the LATCHED RAM ADDRESS signal to the multiplexer labeled Mux 3 270, and Bus 268b transmits the LATCHED RAM ADDRESS signal to Latch 5 260. Mux 3 270 will select the LATCHED RAM ADDRESS when its control line, the PREDICTION SLIP signal on Line 96, is inactive. As previously described, the PREDICTION SLIP signal is inactive when the Limit Verification Circuitry 92 determines that the most recent prediction by the Prediction Circuitry 90 was correct. Therefore, if the most recent prediction was correct, the PREDICTION SLIP signal on Line 96 will cause Mux 3 270 to select the LATCHED RAM ADDRESS signal on Bus 268a to be output on Bus 272.

Figure 7:
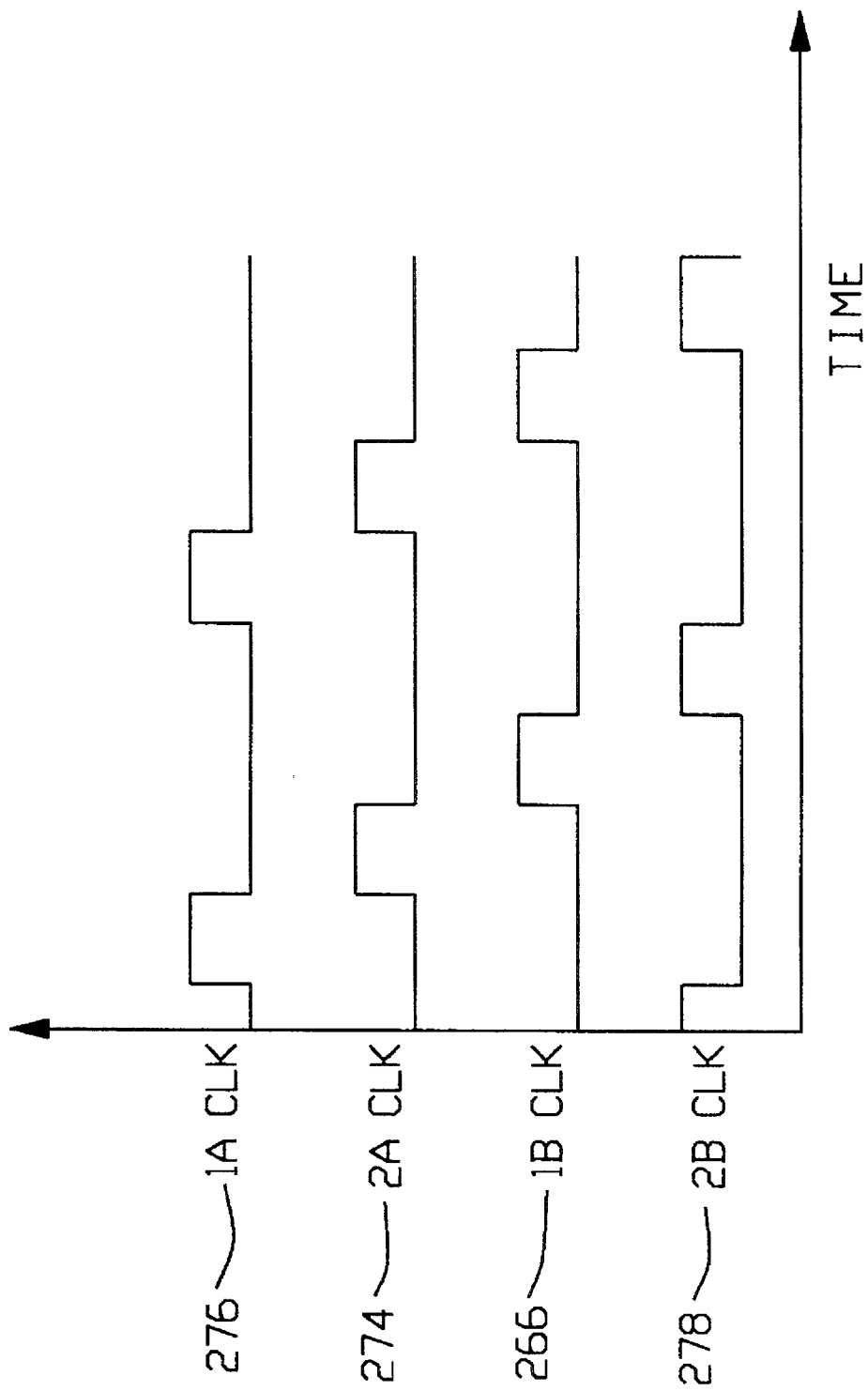
FIG. 7 shows a four-phase clock which was used in the preferred embodiment of the invention.

FIG. 7 shows a four-phase clock which was used in the preferred embodiment of the invention. The 2A CLK on Line 274 becomes active one-quarter of a period following the active edge of the 1A CLK on Line 276. The 1B CLK on Line 266 becomes active one-quarter of a period following the active edge of the 2A CLK on Line 274. The 2B CLK on Line 278 becomes active one-quarter of a period following the active edge of the 1B CLK on Line 266. Finally, the 1A CLK on Line 276 becomes active one-quarter of a period following the active edge of the 2B CLK on Line 278. Reference should be made to FIGS. 6 and 7 for during the following description.

Returning to FIG. 6, the signals on Bus 272 are sent to the Compare Circuitry 280 via Bus 272a, and to Latch 3 256 via Bus 272b. Since the signal on Bus 272b is equal to the RAM ADDRESS on Bus 88c2 when the PREDICTION SLIP signal on Line 96 is inactive, the Compare Circuitry 280 will always find a match. In other words, where the PREDICTION SLIP on Line 96 is inactive, the last prediction was correct, and the selected base address will not be changed since the base address is only changed upon recognition of two consecutive base address selections which are different from the present base address selection. Since the Compare Circuitry 280 will find a match in this case, its output remains inactive so as not to enable Latch 3 256 via Line 282. Therefore, Latch 3 256 will not change its output on Bus 254, and the new "prediction" will be equal to the last RAM ADDRESS.

Where the Limit Verification Circuitry 92 proves the new "prediction" to be incorrect, the Prediction Circuitry may need to change its prediction. If the prediction was incorrect, Mux 1 234 will select the CALCULATED BASE ADDRESS from Bus 94a to be the RAM ADDRESS on Bus 88c. At this time, 1 prediction has proved to be incorrect. If one more consecutive prediction proves to be incorrect, the Prediction Circuitry 90 will change it's latched prediction in Latch 3 256 to access the base address which was accessed two consecutive times. Therefore, the circuitry must make one more attempt to use the same base address that failed the first time.

The following describes the events which take place in order to determine whether the predicted base address fails a second time. While the PREDICTION SLIP signal on Line 96 is active, Mux 3 270 will allow the signals from Latch 5 260 on Bus 284 to be passed to the Compare Circuitry 280 on Line 272a. At this time, Latch 5 260 will be storing the two bit address of the predicted base address which was proved to be incorrect. The other input to the Compare Circuitry 280 comes from Line 88c2, which will be the two bit address determined by the CALCULATED BASE ADDRESS from Bus 94a. The signals on Buses 272a and 88c2 will be different (since the prediction was wrong which caused the CALCULATED BASE ADDRESS to be generated), and the Compare Circuitry 280 will enable Latch 3 256 to latch the output of Mux 3 270. Therefore, Latch 3 256 will be storing the two bit address for the originally predicted base address which was incorrect. This is how the originally predicted base address is allowed a second chance.

While the two bit address for the originally predicted base address was being stored at the output of Latch 3 256, the RAM ADDRESS generated by the CALCULATED BASE ADDRESS on Bus 94a was latched in Latch 4 258 via Bus 88c3. The two bit address for the "originally predicted" base address was then moved to Latch 5 260, as previously described. By this time, the PREDICTION SLIP signal on Line 96 will have become inactive, thus allowing Mux 1 234 to select the address stored in Latch 3 256. As mentioned, Latch 3 256 will be storing the two bit address for the originally predicted base address which was incorrect the first time. Mux 1 234 will allow the original prediction to then be latched in Latch 1 236, and the RAM ADDRESS on Bus 88c will again reflect the original base address prediction. Latch 4 258 will again bump its contents into Latch 5 260, which will consist of the RAM ADDRESS generated by the CALCULATED BASE ADDRESS. When the PREDICTION SLIP signal on Line 96 becomes active, it will allow Mux 3 270 to pass the contents of Latch 5 260 to the Compare Circuitry 280 via Bus 272a. At this time, the other input to the Compare Circuitry 280 will see the two bit address for the "originally predicted" base address on Bus 88c2. These again will not match, and the Compare Circuitry 280 will again allow Latch 3 256 to store the data at its input on Bus 272b. The data on Bus 272b will be what was stored in Latch 5 260, which was the RAM ADDRESS generated by the CALCULATED BASE ADDRESS. Therefore, Latch 3 256 will have changed its prediction to match the RAM ADDRESS which was generated by the CALCULATED BASE ADDRESS. This change was due to two consecutive failures of the original prediction.

FIG. 8 is a timing diagram showing the course of events leading to a base address prediction change. The following description also refers to signals depicted in FIG. 6. Upon activation of 1A CLK on Line 276, the RAM ADDRESS on Bus 88c becomes active as shown in box 300. The 1B CLK on Line 266 then latches the RAM ADDRESS into Latch 4 258, and also latches the previous contents of Latch 4 into Latch 5 260 as shown in box 300. At this time, Latch 4 and Latch 5 will both hold the address of the "originally predicted" base address. When the Limit Verification Circuitry 92 determines that the prediction was incorrect, the PREDICTION SLIP signal on Line 96 will be activated. This occurs when the 2B CLK on Line 278 becomes active as shown in box 304. At the same time, the CALCULATED BASE ADDRESS on Bus 94a is selected by Mux 1 234, and Mux 3 270 allows the contents of Latch 5 260 to be compared to the RAM ADDRESS on Bus 88c2. The RAM ADDRESS will be corrected with the CALCULATED BASE ADDRESS on the occurrence of the 1A CLK on Line 276 as shown in box 306. This will change the signals on Bus 88c2 so that the Compare Circuitry 280 recognizes that the address of the originally predicted base address does not match the RAM ADDRESS generated by the CALCULATED BASE ADDRESS. The Compare Circuitry 280 will allow Latch 3 256 to store the contents of Latch 5 260, but only upon the occurrence of the 2A CLK on Line 274 as shown in box 308. Activation of the 1B CLK on Line 266 will then latch the RAM ADDRESS generated by the CALCULATED BASE ADDRESS into Latch 4 258 as shown in box 310. Latch 5 260 will then receive the contents of what Latch 4 258 had been storing, which will be the two bit address for the originally predicted base address.

At the 2B CLK on Line 278, the PREDICTION SLIP signal on Line 96 will become inactive. Therefore, Mux 1 234 will allow the contents of Latch 3 256, which held the original prediction, to be passed to Latch 1 236. The occurrence of the 1A CLK on Line 276 then generates the RAM ADDRESS which is now based on the address of the originally predicted base address as shown in box 312. The 1B CLK on Line 266 then allows Latch 4 258 to latch this RAM ADDRESS, and forwards the RAM ADDRESS generated by the CALCULATED BASE ADDRESS from Latch 4 to Latch 5 260 as shown in box 314. If the RAM ADDRESS again proves to be wrong (a second time), the Limit Verification Circuitry 92 will again activate the PREDICTION SLIP signal on Line 96 and will send a second CALCULATED BASE ADDRESS via Bus 94a as shown in box 316. When the PREDICTION SLIP signal arrives, Mux 3 270 will allow the Compare Circuitry 280 to compare the contents of Latch 5 260 with the present RAM ADDRESS. Since Latch 5 is storing the RAM ADDRESS generated by the first CALCULATED BASE ADDRESS, it will not match the present RAM ADDRESS on Bus 88c2. This will allow Latch 3 256 to latch the contents of Latch 5 upon the occurrence of the 2A CLK on Line 274. Therefore, Latch 3 256 will hold the first CALCULATED BASE ADDRESS. The prediction therefore changed to equal the first CALCULATED BASE ADDRESS.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. An address prediction apparatus for use in a system which generates absolute addresses for address a system memory by adding a relative address specified in a program instruction to a predicted one of a plurality of available base addresses, and the system further having a memory device to store the plurality of available base addresses, the address prediction apparatus comprising:

prediction means, coupled to an address input port of the memory device, for predicting a base address stored within the memory device, and for generating a first address corresponding to said base address to access said base address from the memory device;

verification means, coupled to said prediction means, for receiving said first address, and for receiving the relative address and generating in response thereto a second address corresponding to an actual base address which the relative address designates, and for providing said second address and a prediction error notification to said prediction means upon determining that said first address and said second address are unequal; and prediction correction means, coupled to said verification means and coupled to said prediction means, for receiving said second address and said prediction error notification, and for causing said prediction means to store said second address and to provide said second address to the memory device to access said actual base address.

2. The address prediction apparatus as in claim 1, wherein said prediction correction means must receive a predetermined number of consecutive ones of said prediction error notifications before causing said prediction means to store said second address and to provide said second address to the memory device to access said actual base address.

3. The address prediction apparatus as in claim 1, wherein said verification means compares the relative address to predetermined relative address boundaries to determine said actual base address.

4. The address prediction apparatus as in claim 1, wherein said prediction means includes instruction address prediction means for predicting said base address when the program instruction indicates that an instruction will be retrieved from the system memory, and further includes operand address prediction means for predicting said base address when the program instruction indicates that an operand will be retrieved from the system memory.

5. The address prediction apparatus as in claim 4, wherein said prediction correction means must receive a first number of consecutive ones of said prediction error notifications before causing said operand address prediction means to store said second address and to provide said second address to the memory device to access said actual base address, and wherein said prediction correction means must receive a second number of said prediction error notifications before causing said instruction address prediction means to store said second address and to provide said second address to the memory device to access said actual base address.

6. A method of predicting which one of a plurality of base addresses to combine with a known relative address in order to generate an absolute address, wherein the base address used in the previous absolute address generation is a factor in the next prediction, and wherein the first prediction will be a predetermined prediction, the method comprising the steps of:

(a) generating a plurality of predicted selection signals using a predetermined prediction algorithm based on previously generated said plurality of predicted selection signals;

(b) addressing a memory device, which stores the plurality of base addresses, with said plurality of predicted selection signals to select a corresponding one of the plurality base addresses;

(c) simultaneously with said step of addressing said memory device with said plurality of predicted selection signals generating a plurality of actual selection signals;

(d) comparing said plurality of predicted selection signals with said plurality of actual selection signals:

(e) retaining said plurality of predicted selection signals for the next selection signal prediction and returning to said step of generating said plurality of predicted selection signals if said plurality of predicted selection signals are equal to said plurality of actual selection signals;

(f) generating a prediction error signal if said plurality of predicted selection signals are not the same as said plurality of actual selection signals ;

(g) voiding said memory base address addressed by said plurality of predicted selection signals;

(h) receiving said prediction error signal and replacing said plurality of predicted selection signals with said plurality of actual selection signals;

(i) addressing said memory device with said plurality of actual selection signals to select said corresponding one of the plurality of base addresses; and (j) retaining said plurality of actual selection signals for the next selection signal prediction and returning to said step of generating said plurality of predicted selection signals.

7. The method as defined by claim 6, wherein said step of receiving said prediction error signal and replacing said plurality of predicted selection signals with said plurality of actual selection signals will replace said plurality of predicted selection signals with said plurality of actual selection signals only upon consecutive receipt of a predetermine number of said prediction error signals.

8. An address prediction circuit for predicting which one of a plurality of base addresses to add to a known relative address in order to generate an absolute address, and for providing a prediction address as the selection address to retrieve the predicted one of the plurality of base addresses from a memory device, and for providing an actual address as the selection address if the prediction address is determined to be incorrect, the address prediction circuit comprising:

first latching means for latching the prediction address;

second latching means for receiving the prediction address as the selection address, and for providing the selection address to the memory device for retrieving the predicted one of the plurality of base addresses from the memory device, and at some later predetermined time for receiving the actual address as the selection address if the prediction address is determined to be incorrect;

memory-block-boundary means for comparing the known relative address to a plurality of predetermined relative address boundaries, and for generating base-address-status signals indicative of which ones of said plurality of predetermined relative address boundaries the known relative address is within;

actual-base-address-selection means, coupled to said memory-block-boundary means, for using said base-address-status signals to generate the actual address for selecting the actual one of the plurality of base addresses;

comparing means, coupled to said actual-base-address-selection means and to said second latching means for receiving the actual address and the prediction address respectively, and for generating a prediction-error-notification if the actual address and the prediction address are not equal; and base-address-selection means, coupled to said first latching means, said second latching means, said comparing means, and said actual-base-address-selection means, for providing the prediction address from said first latching means as the selection address to said second latching means if said prediction-error-notification indicates that the actual address and the prediction address are equal, and for providing the actual address from said actual-base-address-selection means as the selection address to the second latching means if said prediction-error-notification indicates that the actual address and the prediction address are not equal.

9. The address prediction circuit as in claim 8, further comprising:

staged latching means for storing a predetermined number of immediately preceding ones of the selection addresses; and second comparing means, coupled to said second latching means and the staged latching means, for comparing predetermined one of said predetermined number of immediately preceding ones of the selection addresses to the current selection address and providing a prediction change signal if unequal, and for enabling said first latching hearts to receive a new prediction address upon recognition of said prediction change signal.

10. An address prediction apparatus for use in a system which generates absolute addresses for addressing a system memory by adding a relative address specified in a program instruction to a predicted one of a plurality of available base addresses, and the system further having a memory device to store the plurality of available base addresses, the address prediction apparatus comprising:

history means for providing a history of past base address usage;

prediction means coupled to said history means for predicting a base address stored within the memory device and for generating a first address to access the predicted base address;

verification means coupled to said prediction means for calculating a second address in the memory device based upon the relative address and for comparing said first address and said second address, said verification means including prediction error notification means for providing a prediction error signal when said first address and said second address fail to meet a predetermined comparison criteria; and correction means for providing said second address to the memory device in response to said prediction error signal, said correction means coupled to said history means for storing said second address as part of said past base address usage.

\* \* \* \* \*